United States Patent

[11] 3,553,420

[72] Inventors Thomas W. Shearer, Jr.
Auburn Heights;
Charles M. Peters, Grosse Pointe Park; Jon D. Tincher, Warren, Mich.
[21] Appl. No. 840,929
[22] Filed July 11, 1969
[45] Patented Jan. 5, 1971
[73] Assignee General Motors Corporation
Detroit, Mich.
a corporation of Delaware

[54] METHOD AND APPARATUS FOR CONTROL OF RESISTANCE WELDING
10 Claims, 6 Drawing Figs.
[52] U.S. Cl. .................................................. 219/110, 33/172
[51] Int. Cl. ................................................... B23k 11/24
[50] Field of Search .......................................... 219/108-
—110, 86, 89; 33/172, (air digest); 73/37.5

[56] References Cited
UNITED STATES PATENTS
3,417,221 12/1968 Hayword ..................... 219/109

Primary Examiner—J. V. Truhe
Assistant Examiner—J. G. Smith
Attorneys—Jean L. Carpenter, Paul Fitzpatric and Warren D. Hill ABSTRACT: In spot welding, weld nugget growth is monitored by an arrangement including a hydraulically operated electrode, and a check valve to trap fluid in the hydraulic cylinder. Thermal expansion of the workpiece produces a force on the electrodes and a pressure rise in the hydraulic fluid. An electrical transducer senses the pressure rise and produces an electrical signal proportional to work expansion which operates a circuit for terminating welding current when the pressure rise ceases. For pneumatically driven electrodes, an auxiliary hydraulic locking cylinder provides the pressure signal.

INVENTORS
Thomas W. Shearer, Jr.,
Charles M. Peters &
BY Jon D. Tincher

Warren D. Hill
ATTORNEY

METHOD AND APPARATUS FOR CONTROL OF RESISTANCE WELDING

This invention relates to a method and apparatus for monitoring weld nugget growth and for controlling applied welding energy.

Ordinarily, the electrical energy for resistance welding operations is controlled by a preprogrammed circuit which supplies electrical energy at a programmed rate for a predetermined time. The control parameters are selected empirically for a given type and size of parts to be welded, the parameters being selected so that an optimum weld is hopefully obtained. Thereafter, thousands of similar parts are welded according to the control setting. In the event that different types of sizes of parts are to be welded, the control settings must be readjusted for optimum results. Moreover, even when similar parts are to be welded with the same setting, optimum welds do not always occur because ordinarily the parts vary slightly in material or thickness and because welding electrode configurations continually change through wear. As a result, conventional welding controls sometimes produce below standard welds because too much or too little welding energy has been applied to the work. Often when too much energy has been applied to the work. Often when too much energy has been applied, flashing results and molten or plastic metal is extruded from the weld joint. When too little energy is applied, the weld nugget does not grow to its maximum size.

It is thus desirable to provide a welder control which provides for each weld the optimum amount of electrical energy to produce a weld of optimum strength regardless of the size, number and material of the parts to be welded, and moreover, to eliminate flashing.

The prior art has recognized that a welder control of the desired type could be based on the principal of monitoring the separation of the welding electrodes during the welding cycle and turning off the welding current as soon as the electrodes have reached their maximum separation and have begun to move together. That is, when the weld nugget growth has reached its maximum, the workpieces become plastic and the electrodes indent the workpiece surface at a rate which offsets the thermal expansion.

It has been proposed to carry out the monitoring of the electrode separation or displacement by devices which are wholly unsuitable for normal industrial usage, for example, mechanical amplifiers and switches attached to the movable electrode. Such devices are unsuitable because they occupy space at a location which may crowd or interfere with other equipment and make the arrangement of equipment difficult. In addition, such devices are subject to rough usage which causes damage or loss of calibration. Moreover, in the case of portable welding guns, such devices add to the bulk and weight of the apparatus.

It is therefore a general object of this invention to provide a method and apparatus for monitoring welding electrode displacement which avoids the disadvantages set forth above.

It is a further object of the invention to provide a practical method and apparatus for controlling electrical welding energy applied to a workpiece to assure optimum weld strength.

It is another object of the invention to provide a method and apparatus for controlling optimum applied welding energy which does not encumber the welding gun.

It is still another object of the invention to provide a commercially practical method and apparatus for controlling optimum applied welding energy for a wide range of materials, part thicknesses and number of parts at a single welder control setting.

It is a further object of the invention to provide a method and apparatus for producing an electrical signal at a location remote from the welding gun which is a function of expansion of the parts being welded.

The invention is carried out by clamping the parts between welding electrodes, generating an hydraulic pressure signal as a function of electrode separation while electrical energy is applied to the parts and generating an electrical signal as a function of the pressure signal so that the electrical signal is a function of weld nugget growth. The invention also contemplates controlling the electrical energy applied to the parts as a function of the electrical signal to obtain maximum weld strength.

The invention is further carried out by providing a fluid actuator to move a welding electrode against the part to be welded, a confined body of liquid associated with the actuator so that the liquid is pressurized due to electrode movement during the application of electrical energy and transducer means subject to the confined body of liquid to produce an electrical signal in response to the liquid pressure. It is also contemplated to provide an electrical circuit responsive to the electrical signal for controlling the application of electrical energy to the parts.

The invention is further carried out by providing a positive displacement hydraulic motor for driving a welding electrode against the work to be welded, a hydraulic pressure source for driving the hydraulic motor, a valve between the source and the motor for preventing fluid flow from the motor so that electrode movement caused by thermal expansion of the work results in a pressure signal in the motor fluid and a pressure transducer subject to the motor fluid for producing an electrical signal according to the pressure signal. It is further contemplated to provide a circuit responsive to the electrical signal for sensing the time at which the pressure signal no longer increases or begins to decrease and causing the applied electrical energy to diminish.

The above and other advantages will be made more apparent from the following specification taken in conjunction with the accompanying drawings wherein like reference numerals refer to like parts and wherein.

Figure 1:
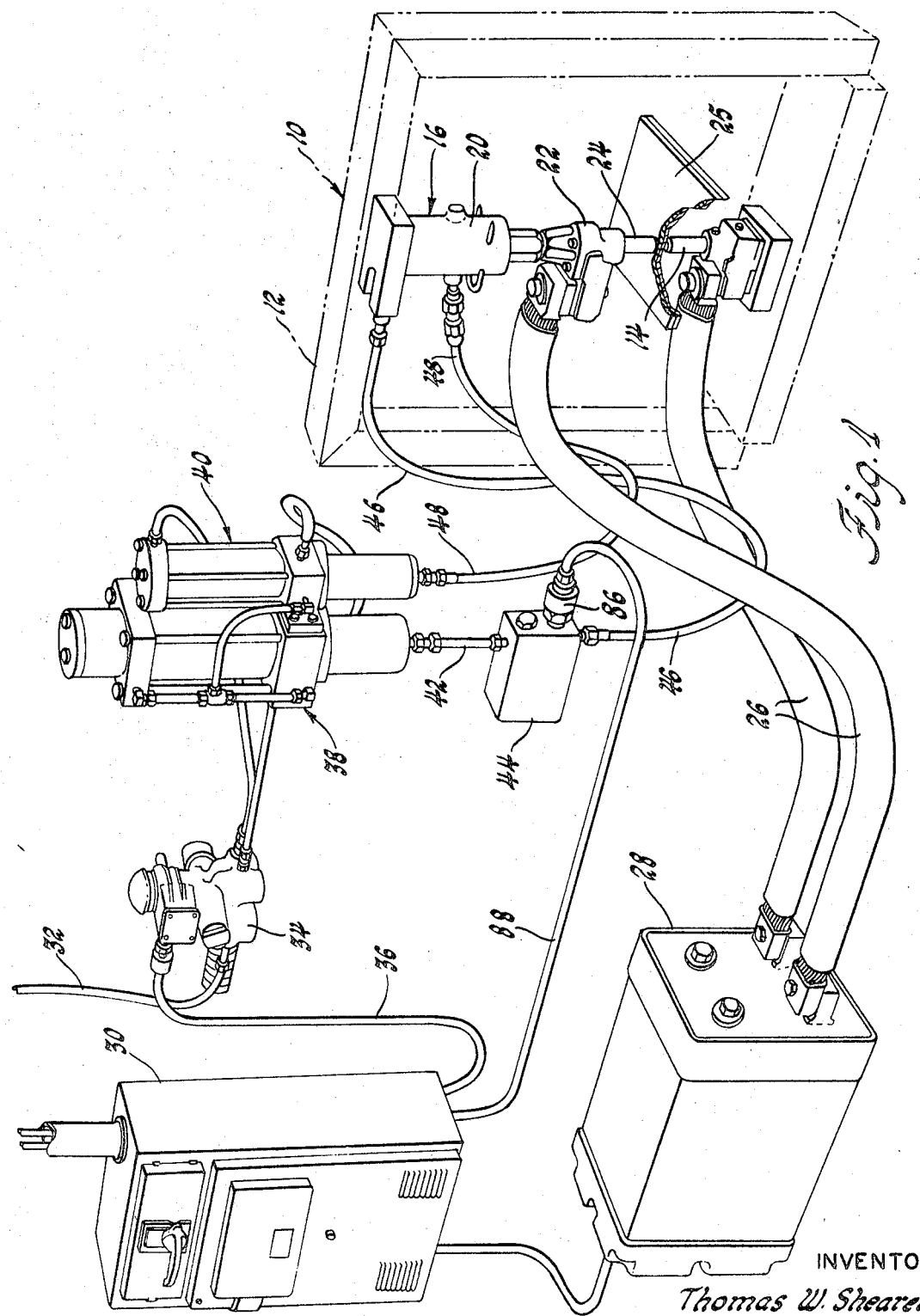
FIG. 1 is an isometric view of a spot-welding apparatus according to the invention.
Figure 2:
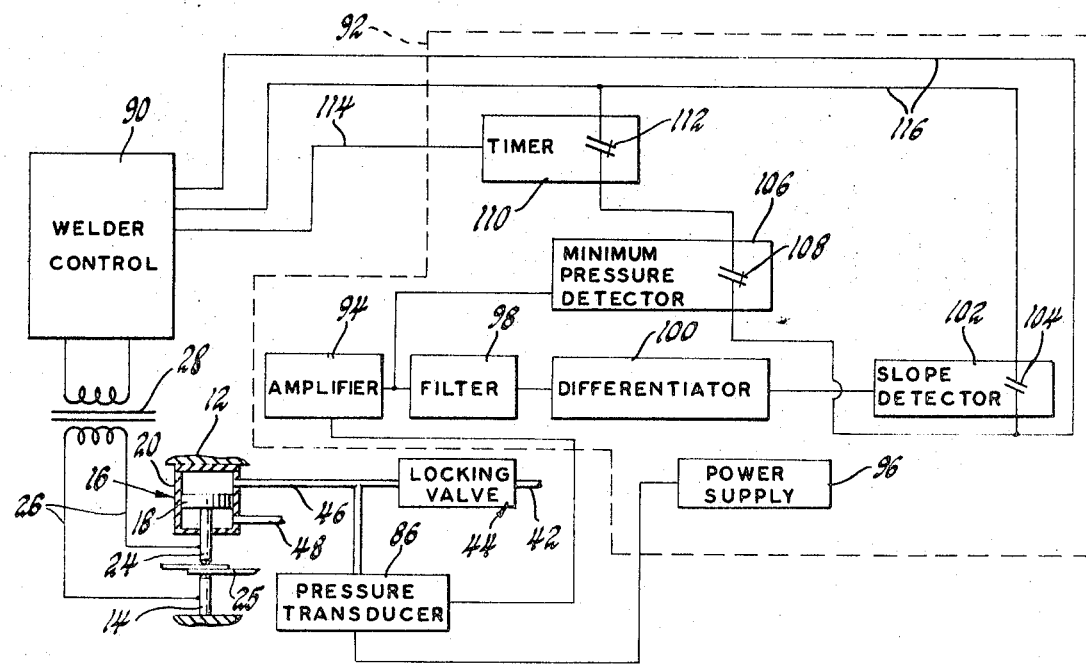
FIG. 2 is a diagrammatic view of a portion of the apparatus of FIG. 1 and particularly of the control circuitry.

Referring to FIG. 1, a conventional spot-welding apparatus 10 includes a weld press frame 12 supporting a lower stationary electrode 14 and a positive displacement hydraulic motor 16 which includes a piston 18 within a cylinder 20 as best shown in FIG. 2. The piston 18 carries an electrode holder 22 that in turn supports an upper electrode 24 which is movable by the piston 18 to clamp work 25 to be welded between the electrodes 14 and 24. The electrodes 14 and 24 are connected by high current welding cables 26 to a transformer 28. A welder control 30 electrically connected to the transformer 28 controls the electrical energy applied to the electrodes by the transformer 28. An air supply 32 is connected to a conventional solenoid controlled four-way valve 34 which is operated by an electrical connection 36 to the welder control 30. The air valve 34 is connected by a conventional air hydraulic booster 38 for pressurizing the hydraulic motor 16 and a second air hydraulic booster 40 for returning the hydraulic motor 16. Hydraulic fluid is supplied from the booster 38 through a conduit 42 having a locking valve 44 and a conduit 46 to the hydraulic motor 16 above the piston 18. The hydraulic booster 40 is connected by a conduit 48 to the hydraulic motor 16 below the piston 18. The apparatus thus far described, except for the locking valve 44, and a portion of the welder control 30, is conventional welding equipment commonly used for industrial applications.

Figure 3:
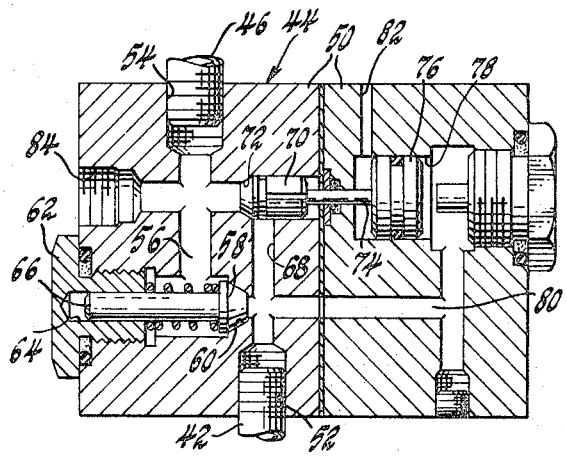
FIG. 3 is a cross-sectional view of the locking valve of FIG. 1.

The locking valve 44 is a device for permitting hydraulic fluid to pass from the hydraulic booster 38 to the hydraulic motor 16 but preventing reverse flow from the motor 16 to the booster 38 so long as actuating pressure is applied to the locking valve 44 via conduit 42. However, fluid flow from the motor 16 through the valve 44 is permitted when the hydraulic pressure is relieved in conduit 42. An example of a suitable locking valve 44 is depicted in FIG. 3. The valve includes a two-part valve body 50 having an inlet port 52 connected to the conduit 42 and a outlet port 54 connected to the conduit 46. The ports 52 and 54 are connected by a passage 56 containing a spring-biased check valve 58 which seats against a shoulder 60 in the passage 56. A plug 62 in one side of the valve body 50 contains a central bore 64 which receives and guides a stem 66 of the check valve 58. A bypass passage 68 interconnects the ports 52 and 54 and contains a bypass valve 70 which seats against a shoulder 72 in the passage 68. The bypass valve 70 is connected by a stem 74 to a pilot piston 76 within a cylinder 78. One end of the cylinder 78 is connected by a passage 80 to the port 52 and the opposite end of the cylinder 78 is connected to atmosphere by a bleed passage 82. In operation, when fluid pressure is applied at port 52, the spring bias of the check valve 58 will be overcome to allow that valve 58 to open and permit fluid to flow through the passage 56 to the outlet port 54. The fluid pressure applied through passage 80 urges the piston 76 to the left to maintain the bypass valve 70 closed. In the event that the pressure at port 54 exceeds the pressure at the port 52, the check valve 58 will close to prevent reverse fluid flow through the passageway 56. Consequently, the higher pressure at port 54 can be sustained so long as fluid pressure is applied at the port 52. When, however, the pressure at the port 52 is relieved, the piston 76 will no longer hold the bypass valve 70 closed and the fluid will flow from the port 54 through the bypass passage 68 to the port 52. A third port 84 is connected directly to the passage 56 so that it is always in direct communication with the outlet port 54. The port 84 is adapted to receive a pressure transducer 86 which generates an electrical signal proportional to the pressure at port 54. As shown in FIG. 1, the pressure transducer 86 is connected to the welder control 30 by a line 88.

FIG. 2 illustrates in block form the welder control 30 which comprises a conventional welder control 90 and a special compensating circuit 92. The compensating circuit 92 includes at its input an amplifier 94 connected to the output of the pressure transducer 86. The pressure transducer is energized by a power supply 96 and produces an electrical output substantially proportional to the pressure in the conduit 46. The amplified output flows from the amplifier 94 through filter 98 to a differentiator 100 which determines the slope of the pressure curve 101 (FIG. 4) caused by transducer 84. A slope detector 102 with normally open output contacts 104 is connected to the output of the differentiator 100. When the slope of the pressure curve 101 is positive the contacts 104 close and when the slope becomes zero or negative the contacts 104 open.

The amplified output is also fed from the amplifier 94 to a minimum pressure detector 106 having normally closed contacts 108. When the amplifier 94 output reaches a predetermined minimum the contacts 108 will open.

A timer 110 has normally closed contacts 112. The timer 110 is electrically connected by a line 114 to the welder control 90 and is actuated thereby when welding current is applied to the electrodes. The contacts 112 will open at a preset time after timer actuation. The timer contacts 112 are connected in series with the minimum pressure detector contacts 108 and that series arrangement of contacts 108,112 is connected across the slope detector contacts 104 as well as across lines 116 which lead to the welder control 90. The welder control 90 is so arranged that when the circuit including the lines 16 are connected by closing the contacts 108 and 112 or the contact 104 welding current is permitted but when the circuit is opened, the welding current is diminished. The term "diminish" as used herein is intended to mean either "to cease entirely" or "to partially decrease."

The purpose of the compensating circuit 92 is to compute the time at which the electrical energy applied to the work 25 should be diminished. The slope detector 102 determines when the electrical signal from the pressure transducer and hence the pressure in the conduit 46 reaches a maximum, that is, when the slope becomes zero or changes from positive to negative. When that point is reached, the contacts 104 are opened to diminish the electrical energy applied to the work 25. This a is accomplished, for example, in the case of a conventional phase-shift welder control by adding a resistor in the phase-shift circuit, not shown, which is sufficient to diminish the electrical energy applied by the transformer 28. It has been found that during the initial portion of a welding cycle anomolies can occur which cause the pressure curve as represented by the transducer 86 output signal to flatten. For example, in the welding of galvanized parts, the galvanized coating softens early in the weld cycle to allow electrode indentation, thus giving rise to a spurious inflection point on the pressure curve which would be interpreted by the slope detector 102 as the maximum point of the pressure curve. To avoid a spurious output on line 16, the slope detector contacts 104 are bypassed by the contacts 108 and 112 until a predetermined minimum pressure has been obtained or a predetermined time has elapsed. The minimum pressure selected is a value above that at which the galvanized coating softening usually occurs. Another anomaly occurs when an edge weld is made. Then the predetermined minimum pressure may never be obtained due to extrusion of plastic metal from between the parts. Then as soon as the preset time elapses the slope detector 102 is effective to terminate the weld instead of allowing a complete preprogrammed welding cycle to continue as would occur in a conventional welding system. Thus, the general operation of the compensating circuit 92 is to diminish welding energy when the electrode pressure ceases to increase except during a variable blanking period during which the slope detector is disabled, in effect, for a duration depending on the rate of pressure rise, the preset minimum pressure, and the preset time.

The individual components of the system as shown in FIG. 2 with the exception of the locking valve 44 are commercially available devices. For example, the pressure transducer 86 may be a Statham pressure transducer 0PG285 TC-1 M-3, Statham Instruments, Inc. The power supply 96, the amplifier 94, the filter 98 and the differentiator 100 are obviously well known items of commerce. The slope detector 102 and minimum pressure detector 106 may comprise a transistorized voltage sensitive relay model 0357511 VS580 A1 with a mercury-wetted relay model 0357505 KW501 A1, General Electric Company. The timer 110 may be a timing relay, Class 8991, type ATO-16, Square D Company. The welder control 90 may be a welder controller, Class 8992, type EQ2057-G6, Square D Company.

Figure 4:
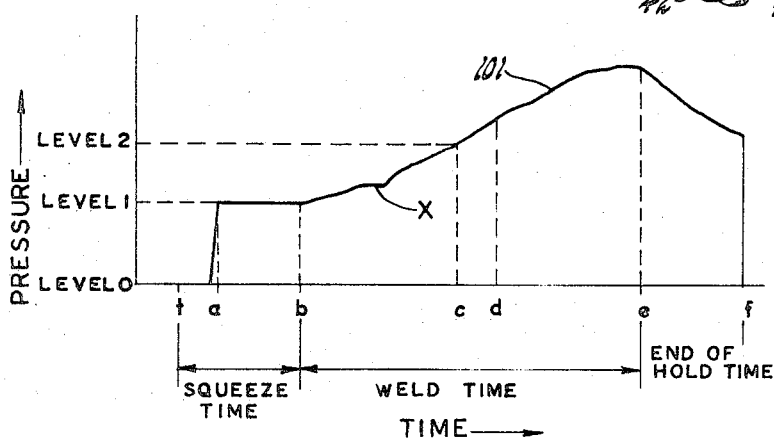
FIG. 4 is a graphical illustration of welding pressure vs. time.

The operation of the system is described with reference to the graph of FIG. 4 which depicts the pressure in the hydraulic motor as a function of time. To make a weld the work 25 is placed between electrodes 14 and 24. The welder control 30 is actuated either automatically or manually to shift the air valve 34 at time $t$ so that air is supplied to the hydraulic booster 38 and hydraulic fluid under pressure is supplied through the locking valve 44 and conduit 46 to the hydraulic motor 16, thus depressing the piston 18 and moving the electrode 24 against the work 104 to clamp the work. This results in a pressure increase at time $a$, when the work becomes clamped between the electrodes and thereafter the pressure remains constant at level 1 until time $b$. At time $b$, the welder control 30 energizes the transformer 28 to supply electrical energy to the work 104. This is allowed by the compensating circuit 92 since the contacts 108 and 112 are closed. As the work becomes heated, thermal expansion occurs which causes the electrodes to move apart or separate, thus urging the piston 18 upward in the cylinder 20. Since the locking valve 44 prevents the flow of hydraulic fluid from the hydraulic motor 16 to the booster 38, the body of hydraulic fluid within the motor and the conduit 46 is confined and the upward force on the electrode 22 causes a proportional pressure increase in the confined body of fluid. This pressure increase is sensed by the transducer 86 which produces an electrical signal proportional to the pressure. As shown in FIG. 4, the pressure continues to rise, except for a flat portion at point $x$, so that at time $c$, the predetermined minimum pressure (at level 2) is attained prior to the time $d$ when the timer 110 times out. During the pressure rise the slope detector contacts 104 close. Thus at time $c$, the minimum pressure detector 106 opens the contacts 108 which enables the slope detector 102. If, on the other hand, the pressure had not attained the minimum value by time $d$, the timer 110 would open its contacts to enable the slope detector 102. The flat portion at $x$ is caused by the softening of a galvanized coating and the consequent indentation by the electrode. The contacts 104 open during this flat portion but that has no effect on the welder control 90 because the contacts 108 and 112 are closed at that time. As the weld progresses past time $d$, the pressure continues to rise until at time $e$, the weld nugget attains its maximum size and the work 104 becomes sufficiently plastic that the electrodes 14 and 24 indent the surface of the work by an amount large enough to offset the thermal expansion and the net force on the electrodes and the pressure on the confined body of fluid no longer increases. Then the slope detector 102 senses the inflection point in the electrical signal and opens the contacts 104 to diminish the electrical energy applied to the work. Usually the welder control 90 is programmed to maintain the electrodes 14 and 24 clamped to the work 25. The cooling and contraction of the work is reflected in the negative slope of the pressure signal between times $e$ and $f$. Usually it is desirable to cut off current or electrical energy at time $e$ since the weld has been completed. However, as is well-known, it is sometimes desirable to continue applying electrical energy at a lower rate, for example, if slow cooling of the weld nugget is desired. In any event, at point $e$, electrical energy is diminished to a value below that required to sustain a net heat input to the weld nugget. By thus detecting the point at which optimum nugget growth has occurred, and decreasing electrical energy at that point, it can be insured that sufficient electrical energy has been supplied to achieve optimum weld strength and that insufficient energy has been applied to the nugget to cause extrusion of metal from the joint or flashing. At point $f$, the weld cycle is terminated by cutting off the decreased current, if any, and moving the electrode 24 upward. The latter is accomplished by shifting the four-way air valve 34 to relieve the pressure in the conduit 42, thus permitting reverse flow through the locking valve 44 and to apply pressure through conduit 48 thus forcing the piston 18 and the electrode 24 upward.

In practice, the welder control 90 may be set at a nominal heat or current value generally suitable for the type of parts being welded. Similarly, the pressure is selected which is suitable for the maximum individual part thickness expected to be encountered. Then parts may be successively welded without further adjustments even though the material composition of the parts, the thickness of the parts and even the number of parts included in a single weld vary considerably. For each weld the nugget growth is monitored by the compensating circuit 92 to insure that weld energy is applied until the nugget growth reaches a maximum and that excessive weld energy is not applied.

It will be noted that a feature of this invention is that by locking the fluid within the hydraulic motor, the pressure of the electrodes against the work increases by a large amount in excess of the pressure supplied by the hydraulic booster 38. Thus, greater clamping forces are achieved without the expense of providing a hydraulic booster of a higher pressure output. It has been found in practice that as depicted in FIG. 4, the pressure increase in some cases exceeded the initial clamping pressure.

Figure 5:
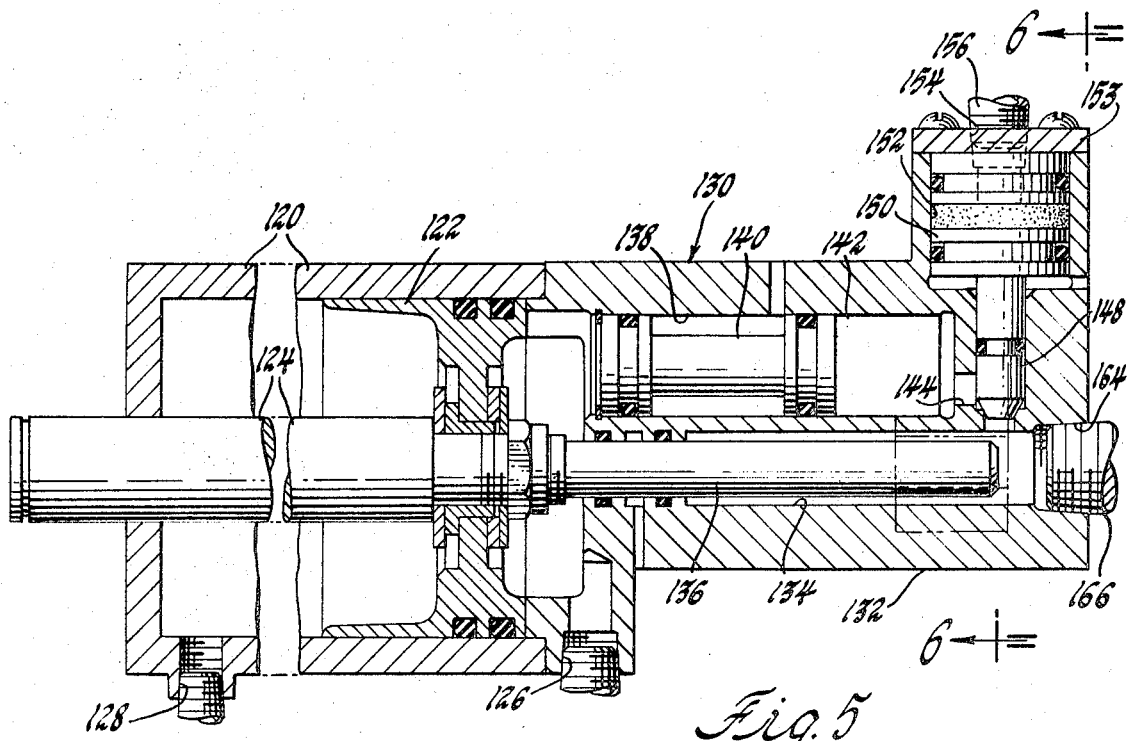
FIG. 5 is a cross-sectional view of a hydraulic signal transducer according to a second embodiment of the invention.
Figure 6:
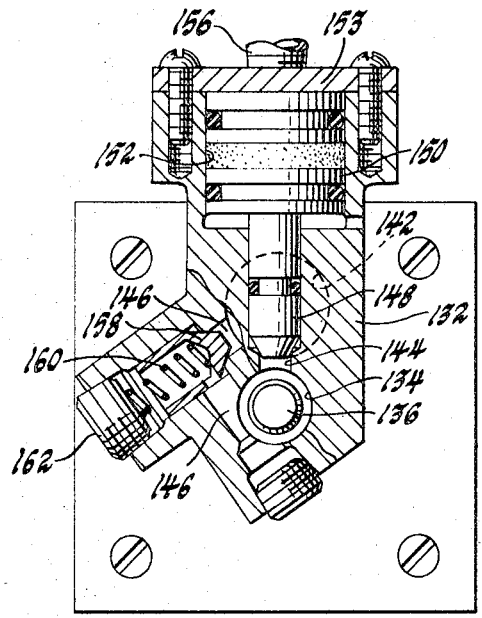
FIG. 6 is a cross-sectional view taken along line 6–6 of FIG. 5.

An exemplary application of the invention to welding guns having pneumatic means for operating the movable electrode is illustrated in FIGS. 5 and 6. A pneumatic motor comprises a cylinder 120 and a piston 122 therein. An electrode holder 124 is secured to the piston 122 and extends through an end wall of the cylinder 120. A port 126 is provided at one end of the cylinder 120 to admit pneumatic pressure for moving the piston 122 to the left to extend the electrode holder 124 and a port 128 at the opposite end of the cylinder 120 to admit pneumatic pressure for return of the piston 122 to the idle position as shown. A pressure transducer 130 is secured to the right end of the cylinder 120 and includes a housing 132. A bore 134 in the housing 132 is arranged in line with the piston 122 and slidably receives a rod 136 which is attached at one end to the piston 122 and is movable therewith. A second bore 138 is arranged parallel to the bore 134 and communicates at the left end with the cylinder 120. A spoollike piston 140 within the bore 128 defines a variable volume reservoir 142 at the right end of the bore 138 and isolates that reservoir 142 from the cylinder 120. The reservoir 142 communicates by passages 144 and 146 with the bore 134. A bypass valve 148 disposed in the housing 132 at right angles to the bore 134 is adapted to seat in the passage 144 to block the fluid flow therethrough. The bypass valve 148 is operated by a piston 150 arrangement in a cylinder 152. A cap 153 closing the cylinder 152 contains a port 154 connected by a conduit 156 with the same source of pressure which feeds the port 126 so that the valve 148 is held closed when air pressure is applied to the port 154. Hydraulic fluid fills the reservoir 142, the bore 134 and the communicating passages 144 and 146. A check valve 158 in the passage 146 is biased to closed position by a spring 160 which reacts against a closure plug 162. The check valve 158 is so disposed that fluid may flow from the reservoir 142 through the passage 146 to the bore 134 but not in the opposite direction. Hydraulic fluid fills the reservoir 142, the bore 134 and the passages 144 and 146. A port 164 at one end of the bore 134 allows a pressure transducer, not shown, to be attached to the pressure transducer adapter 130 through a threaded fitting 166.

In operation, when pneumatic pressure is applied to ports 126 and 156, the piston 122 is forced to the left an the piston 150 is forced downward as shown in the drawings to seat the valve 148, thereby closing the passage 144. The piston 140 is urged to the right by the pressure in the cylinder 120 so that as the rod 136 is withdrawn from the bore 134, hydraulic fluid will flow from the reservoir 140 through the passage 146, unseating the check valve 158, and into the bore 134. After the electrode carried by the electrode holder 124 has engaged the work to be welded and thermal expansion of the work occurs, the resulting force applied through the piston 122 and the rod 136 will generate a pressure rise in the bore 134 since the hydraulic fluid therein is confined by the check valve 158 and the bypass valve 148. Hence, the pressure within the bore 134 is a function of the thermal expansion of the work and the pressure is sensed by the transducer connected to the port 164. At the end of the welding cycle, pneumatic pressure is relieved from ports 126 and 154 and pressure is applied to the port 128 to urge the piston 122 and the rod 136 to the right. The relief of pressure from the cylinder 152 allows the valve 148 to be unseated by the hydraulic pressure in the bore 134 so that hydraulic fluid will flow from the reservoir 134 through the passage 144 to the reservoir 142. It will thus be seen that the pressure transducer adapter 130 not only provides a pressure signal related to the thermal expansion of the work to be welded but also like the arrangement shown in FIGS. 1, 2 and 3, locks the electrode operating piston 122 during the period of weld energy application so that forces much greater than that supplied by the pneumatic pressure source will be applied to the work by the electrode.

We claim:

1. In a method of resistance welding including clamping the parts to be welded between electrical energy applying electrodes and applying electrical energy to the parts thereby causing thermal expansion of the parts which tends to cause electrode separation:

the method of controlling the applied electrical energy to achieve optimum nugget growth and to prevent the application of excessive electrical energy to the parts comprising:
generating a hydraulic pressure signal as a function of electrode separation due to said thermal expansion;
generating an electrical signal as a function of the hydraulic pressure signal and responsive thereto; and
controlling the applied electrical energy in response to the electrical signal.

2. In a method of controlling applied electrical energy in resistance welding including clamping the parts to be welded between electrical energy applying electrodes and applying electrical energy to the parts thereby causing thermal expansion of the parts which tends to cause displacement of one of the electrodes relative to the other:
the method of controlling the applied electrical energy to achieve optimum nugget growth and to prevent the application of excessive electrical energy to the parts comprising:
generating a hydraulic pressure signal as a function of electrode displacement due to said thermal expansion by pressurizing liquid in a confined volume by the displaced electrode;
generating an electrical signal as a function of the hydraulic pressure signal by a transducer subject to the pressurized liquid; and
controlling the applied electrical energy according to a programmed function of the electrical signal.

3. A method of controlling applied electrical energy in resistance welding to achieve optimum weld nugget size and to prevent the application of excessive electrical energy to the work comprising:
positioning the work to be welded between a pair of electrical energy applying electrodes;
forcing one of the electrodes toward the other and against the work by a hydraulic motor operated by pressurized hydraulic fluid;
blocking flow of fluid from the hydraulic motor;
applying electrical energy to the work thereby causing thermal expansion of the work which tends to displace the said one electrode thereby producing in the hydraulic motor a pressure signal proportional to electrode displacement;
generating an electrical signal as a function of the pressure signal by a transducer subject to the pressurized liquid; and
controlling the applied electrical energy according to a programmed function of the electrical signal.

4. A method of controlling applied electrical energy in resistance welding to achieve optimum weld nugget size and to prevent the application of excessive electrical energy to the work comprising:
positioning the work to be welded between a pair of electrical energy applying electrodes;
forcing one of the electrodes toward the other and against the work by a hydraulic motor operated by pressurized hydraulic fluid;
blocking flow of fluid from the hydraulic motor;
applying electrical energy to the work thereby causing thermal expansion of the work which tends to displace the said one electrode thereby producing in the hydraulic motor a pressure signal proportional to electrode displacement;
generating an electrical signal as a function of the pressure signal by a transducer subject to the pressurized liquid whereby an increase in the electrical signal signifies weld nugget growth;
controlling the applied electrical energy by diminishing the welding current when the electrical signal ceases to increase; and
permitting fluid flow from the hydraulic motor to allow electrode movement from the work when the weld is completed.

5. In a method of controlling applied electrical energy in resistance welding including clamping the parts to be welded between welding electrodes, and applying electrical energy to the parts through the electrodes thereby causing thermal expansion of the parts and causing a force proportional to the expansion to be applied to the electrodes;
the method of controlling the applied electrical energy to achieve optimum nugget growth and to prevent the application of excessive electrical energy to the parts comprising:
transferring the force through an electrode to a confined body of liquid thereby producing a pressure signal in the body of liquid proportional to the expansion of the parts;
generating an electrical signal as a function of the pressure signal and responsive thereto; and
controlling the applied electrical energy in response to the electrical signal.

6. In a method of controlling applied electrical energy in resistance welding including clamping the parts to be welded between welding electrodes, and applying electrical energy to the parts through the electrodes thereby causing thermal expansion of the parts and causing a force proportional to the expansion to be applied to the electrodes:
the method of controlling the applied electrical energy to achieve optimum nugget growth and to prevent the application of excessive electrical energy to the parts comprising:
transferring the force through an electrode to a confined body of liquid thereby producing a pressure signal in the body of liquid proportional to the expansion of the parts;
generating an electrical signal as a function of the pressure signal and responsive thereto whereby an increase in the electrical signal is a function of the weld nugget growth; and
controlling the applied electrical energy in response to the electrical signal by diminishing the electrical current applied to the parts when the electrical signal ceases to increase.

7. In a resistance welding apparatus having a pair of opposed electrodes for engaging the work to be welded the improvement comprising:
a hydraulic pressure source;
a hydraulic motor connected to the pressure source and actuated thereby;
Means connecting one of the electrodes to the hydraulic motor for exerting a clamping force on the work;
means for supplying electrical energy to the work through the electrodes whereby the work is caused to thermally expand and as a result exert an additional force on the electrodes proportional to the expansion of the work; and
means for monitoring growth of the weld nugget as reflected by the expansion of the work between the electrodes comprising:
valve means for preventing fluid flow from the hydraulic motor thereby confining a body of fluid, whereby the additional force on the electrode produces a pressure signal in the confined body of fluid; and
transducer means in communication with the body of fluid for producing an electrical signal as a function of the pressure signal and the growth of the weld nugget, utilization means responsive to said signal.

8. In a resistance welding apparatus having a pair of the opposed electrodes for engaging the work to be welded the improvement comprising:
a hydraulic pressure source;
a hydraulic motor connected to the pressure source and actuated thereby;
means connecting one of the electrodes to the hydraulic motor for exerting a clamping force on the work;
means for supplying electrical energy to the work through the electrodes whereby the work is caused to thermally expand and as a result exert an additional force on the electrodes proportional to the expansion of the work, the means for supplying electrical energy including a control circuit for controlling the amount of the supplied electrical energy; and means for monitoring growth of the weld nugget as reflected by the expansion of the work between the electrodes and for controlling the application of electrical energy to the work so that optimum nugget growth is achieved and the application of excessive electrical energy to the work is prevented comprising:

valve means for preventing fluid flow from the hydraulic motor thereby confining a body of fluid, whereby the additional force on the electrode produces a pressure signal in the confined body of fluid;

transducer means in communication with the body of fluid for producing an electrical signal as a function of the pressure signal and the growth of the weld nugget; and a circuit responsive to the electrical signal and having its output connected to the control circuit for diminishing the supplied electrical energy according to a programmed function of the electrical signal.

9. In a resistance welding apparatus having a pair of opposed electrodes for engaging the work to be welded the improvement comprising:

a hydraulic pressure source;

a hydraulic motor connected to the pressure source and actuated thereby;

means connecting one of the electrodes to the hydraulic motor for exerting a clamping force on the work;

means for supplying electrical energy to the work through the electrodes whereby the work is caused to thermally expand and as a result exert an additional force on the electrodes proportional to the expansion of the work, the means for supplying electrical energy including a control circuit for controlling the amount of the electrical energy;

means for monitoring growth of the weld nugget as reflected by the expansion of the work between the electrodes and for controlling the application of electrical energy to the work so that optimum nugget growth is achieved and the application of excessive electrical energy to the work is prevented comprising valve means for preventing fluid flow from the hydraulic motor thereby confining a body of fluid, whereby the additional force on the electrode produces a pressure signal in the confined body of fluid;

transducer means in communication with the body of fluid for producing an electrical signal as a function of the pressure signal and the growth of the weld nugget; and a compensating circuit responsive to the electrical signal and having its output connected to the control circuit to affect the operation thereof, the compensating circuit including signal detecting means for detecting the rate of change of the electrical signal amplitude and for producing an output signal when the rate of change becomes zero, the output signal causing the supplied electrical energy to be diminished.

10. In a resistance welding apparatus having a pair of opposed electrodes for engaging the work to be welded:

a hydraulic pressure source;

a hydraulic motor connected to the pressure source and actuated thereby;

means connecting one of the electrodes to the hydraulic motor for exerting a clamping force on the work;

means for supplying electrical energy to the work through the electrodes whereby the work is caused to thermally expand and as a result exert an additional force on the electrodes proportional to the expansion of the work, the means for supplying electrical energy including a control circuit for controlling the amount of the electrical energy; and means for monitoring growth of the weld nugget as reflected by the expansion of the work between the electrodes and for controlling the application of electrical energy to the work so that optimum nugget growth is achieved and the application of excessive electrical energy to the work is prevented, comprising:

valve means for preventing fluid flow from the hydraulic motor thereby confining a body of fluid, whereby the additional force on the electrodes produces a pressure signal in the confined body of fluid;

transducer means in communication with the body of fluid for producing an electrical signal as a function of the pressure signal and the growth of the weld nugget;

a compensating circuit responsive to the electrical signal and having its output connected to the control circuit to affect the operation thereof, the compensating circuit including signal detecting means for detecting the rate of change of the electrical signal amplitude and for producing an output signal when the rate of change becomes zero, the output signal causing the supplied electrical energy to be diminished; and means in the compensating circuit for rendering the output signal ineffective comprising a timer means and a detector means for sensing a predetermined minimum value of the electrical signal, the timer means and the detector means being electrically connected with the signal detecting means to override the output signal until a predetermined time or predetermined value of the electrical signal is attained.

PO-1050
(5/69)

UNITED STATES PATENT OFFICE
CERTIFICATE OF CORRECTION

Patent No. 3,553,420      Dated January 5, 1971

Inventor(s) Thomas W. Shearer, Jr., Charles M. Peters, and Jon D. Tincher

It is certified that error appears in the above-identified patent and that said Letters Patent are hereby corrected as shown below:

In Column 1, line 24, line 25, delete "Often when too much energy has been applied to the work."
In Column 6, after the last line of the specifica and before the claims, insert the following paragraph:
-- The embodiment of the invention described herein is for the purposes of illustration and th scope of the invention is intended to be limited only by the following claims:

Signed and sealed this 17th day of August 1971.

(SEAL)
Attest:

EDWARD M. FLETCHER, JR.
Attesting Officer

WILLIAM E. SCHUYLER, JR.
Commissioner of Patents